United States Patent [19]

Auch et al.

[11] Patent Number: 4,569,593
[45] Date of Patent: Feb. 11, 1986

[54] ROTATION RATE MEASURING INSTRUMENT

[75] Inventors: Wilfried Auch, Asperg; Eberhard Schlemper, Vaihingen, both of Fed. Rep. of Germany

[73] Assignee: International Standard Electric Corporation, New York, N.Y.

[21] Appl. No.: 562,142

[22] Filed: Dec. 16, 1983

[30] Foreign Application Priority Data

Dec. 18, 1982 [DE] Fed. Rep. of Germany ....... 3247014

[51] Int. Cl.$^4$ ........................ G01C 19/64; G01B 9/02
[52] U.S. Cl. .................................................. 356/350
[58] Field of Search ........................ 356/350; 372/94; 350/353, 356

[56] References Cited

U.S. PATENT DOCUMENTS 4,373,814  2/1983  Lacombat et al. ................ 356/350

OTHER PUBLICATIONS

"Sensitive Fiber-Optic Gyroscopes", Physics Today, 10-1981, vol. 34, No. 10.

Primary Examiner—Vincent P. McGraw
Assistant Examiner—S. A. Turner
Attorney, Agent, or Firm—John T. O'Halloran; Robert P. Seitter

[57] ABSTRACT

In the rotation rate measuring instrument, a light beam produced by a laser (1) is divided in a beam splitter (4) into two component beams ($I_{CW}$, $I_{CCW}$) which travel in opposite directions around an optical waveguard (9) forming a closed light path. A Bragg cell (6, 7) is inserted between the beam splitter and each end of the optical waveguide. One of the Bragg cells (6) is driven with a signal ($f_{VCO}$) whose frequency is varied in accordance with the rotation rate. For the other Bragg cell, a switch (33) switches periodically between two drive signals ($f_{MH}$, $f_{ML}$), so that the component beam is frequency-modulated ($f_S$). A regulating facility (12, 13, 54, 55, 56) is provided which compensates for intensity differences between the two component beams. In further embodiments, it is possible to compensate for those intensity variations of the component beam ($I_{CW}$) which are caused by driving the Bragg cell (5) at different frequencies ($f_{MH}$, $f_{ML}$). It is also possible to design the instrument so that both the intensity differences between the two component beams and the intensity variations within one component beam can be compensated for.

10 Claims, 7 Drawing Figures

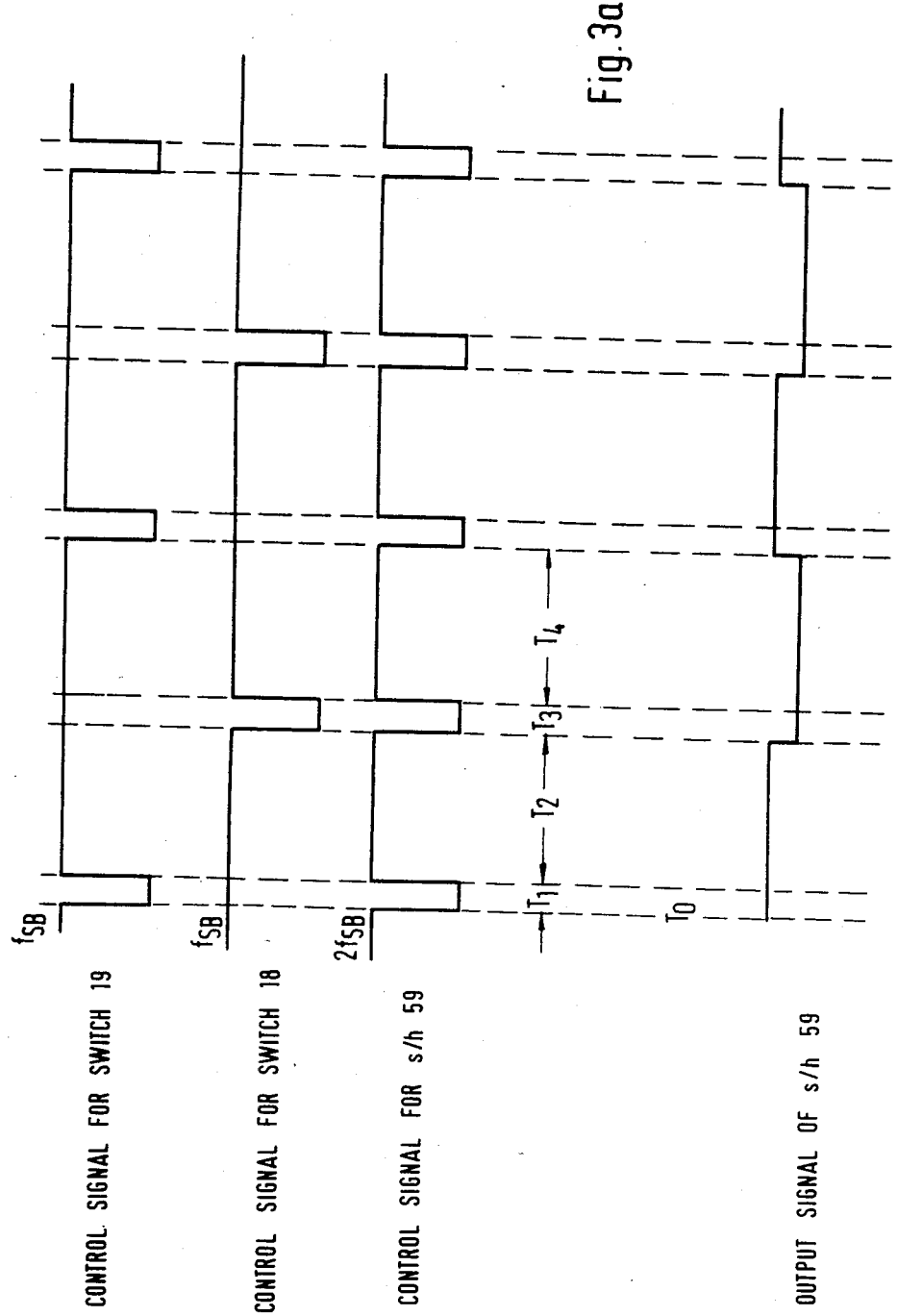

ROTATION RATE MEASURING INSTRUMENT

The present invention relates to a rotation rate measuring instrument as set forth in the preamble of claim 1. An instrument of this kind is described in German patent application P 31 36 688.

In such an instrument, a light beam is split into two component beams, and at least one of the two component beams is coupled into the optical waveguide through a modulator which is presented with a modulating signal of frequency $f_S$. The two component beams are coupled into the ends of the optical waveguide.

Measurements have shown that this measuring instrument produces systematic errors. It was found that these errors are caused by the fact that the two component beams travelling around the optical waveguide in opposite directions influence each other due to nonlinear effects.

The object of the invention is to eliminate the systematic errors.

This object is attained by the means set forth in claim 1, 6 or 8. Advantageous features are claimed in the respective subclaims.

In the novel instrument, it is ensured that component beams emerging from the optical waveguide have the same intensity, or that the difference between their intensities is constant. Furthermore, the component beams emerging from the optical waveguide have no spectral component at the frequency $f_S$ of the modulating signal. Such a component would invalidate the measurement.

As the component beams emerging from the optical waveguide are used to provide regulation, variations in the light coupled into the optical waveguide are compensated for.

If the phase modulators are Bragg cells driven at different frequencies, the following problem arises: The deflection efficiency and the deflection angle depend on the modulating frequency. As a result, the intensity coupled into the optical waveguide varies with the modulator drive frequency.

This, besides the nonlinear effect, is the reason for the variation in the intensities of the component beams leaving the optical waveguide.

In the patent application cited above, to drive the Bragg cell, switching is effected between two drive signals generated in different oscillators. The two drive signals may not always have the same intensity. As a result, the intensity of the component beam phase-modulated by the Bragg cell varies.

The novel rotation rate measuring instrument also eliminates errors caused by the effects described above.

The regulation of the intensity of the drive signal for the modulator can be implemented in a simple manner.

Embodiments of the invention will now be explained in more detail with reference to the accompanying drawings, in which:

FIG. 3a is a timing diagram illustrating the operation of the instrument of FIG. 1, and FIGS. 4 to 6 show further embodiments.

Figure 1:
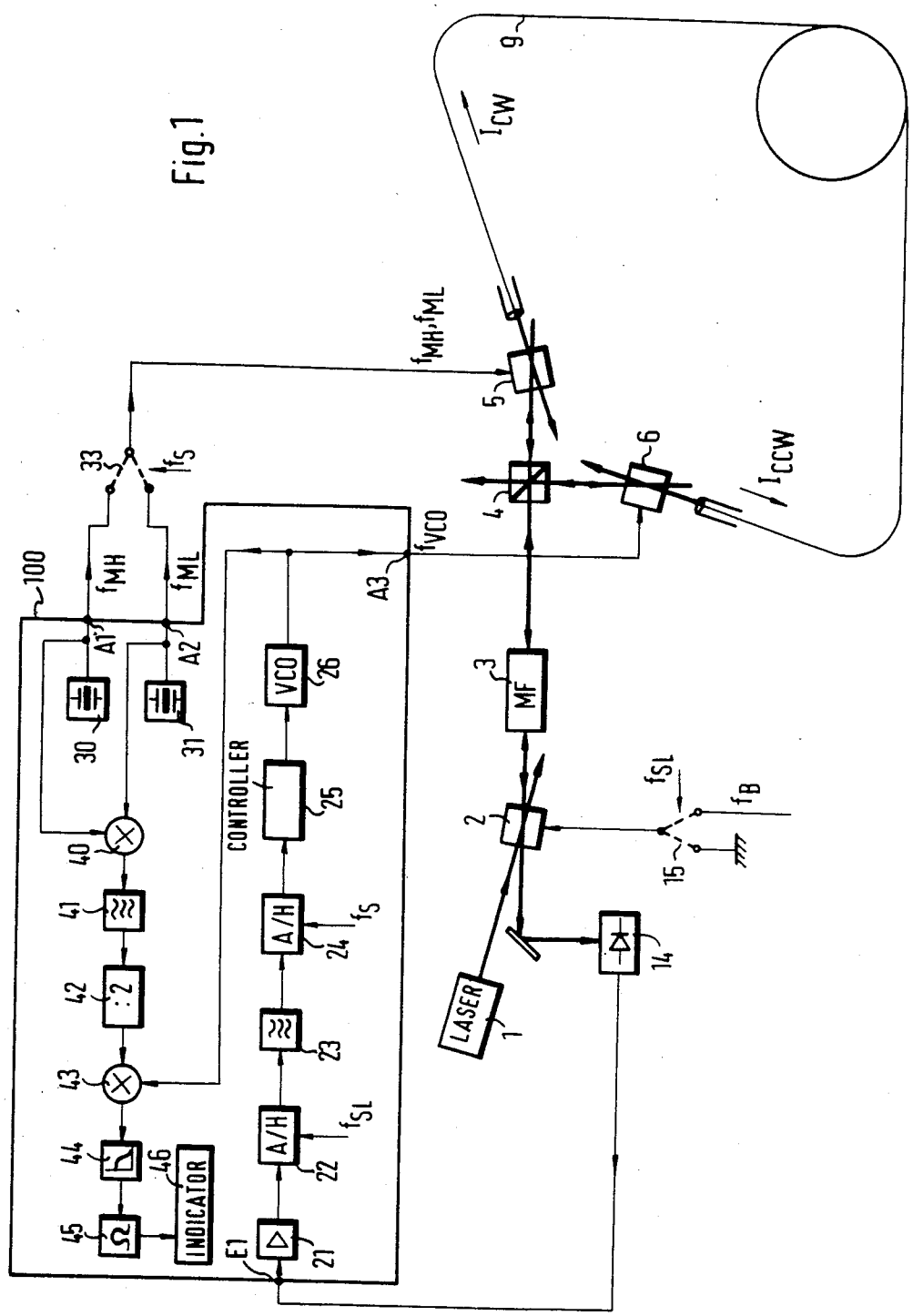
FIG. 1 is a block diagram of a rotation rate measuring instrument without a facility for regulating the intensities of the component beams.

First, a rotation rate measuring instrument without a facility for eliminating systematic errors will be described with the aid of FIG. 1. This instrument is similar to that described in German patent application No. 31 36 688. In the instrument described here, however, a Bragg cell following the light source is used to advantage both to isolate the light source from light reflected back to it and to produce a pulsed light beam; in addition, it serves as a beam splitter. For the purposes of the following description, some of the modulating-signal generating and evaluating circuits were combined in a signal-processing circuit 100 for simplicity.

A light beam produced by a laser 1 enters a Bragg cell 2. The Bragg cell 2 is used as an active beam splitter. To this end, a drive signal of frequency $f_B$ is applied to it periodically through a switch 15 controlled at the frequency $f_{SL}$. The frequency $f_{SL}$ is equal to $1/2\tau$, where $\tau$ is the time taken by a light beam to travel around the optical wave-guide mentioned in the following. During the time that the Bragg cell 2 is driven at the frequency $f_B$, the laser light beam entering the Bragg cell 2 is deflected by a given angle and travels to a single-mode filter 3. The output beam of the single-mode filter 3 enters a passive beam splitter 4, which splits it into two component beams $I_{CW}$ and $I_{CCW}$. These two component beams are directed to two further Bragg cells 5 and 6. The Bragg cell 5, to which the component beam $I_{CW}$ is directed, is driven alternately at the frequencies $f_{MH}$ and $f_{ML}$. A switch 33 switches between these two frequencies at the frequency $f_S$. The Bragg cell 6, to which the component beam $I_{CCW}$ is directed, is driven by the output signal of a voltage-controlled oscillator (VCO) 26. The component beams issuing from the Bragg cells 5 and 6 are coupled into a coiled optical waveguide 9. After emerging from the optical waveguide, the component beams $I_{CCW}$ and $I_{CW}$ enter the Bragg cells 5 and 6, respectively. The passive beam splitter recombines the two component beams, and the resulting beam passes through the single-mode filter 3 to the active beam splitter 2, which is implemented with a Bragg cell. As mentioned above, the drive frequency $f_B$ is switched on and off at intervals of $2\tau$ by means of the switch 15. At the time at which the beam resulting from the superposition of the two component beams reaches the active beam splitter 2, no drive signal is applied to the beam splitter 2, i.e., the beam passes through the beam splitter 2 undeviated and, thus, travels not to the laser 1 but to a deviating mirror which directs it to an optical-to-electrical transducer 14. The output signal of the latter is fed to an input E1 of the signal-processing circuit 100. There this signal passes through an amplifier 21, a first sample-and-hold circuit 22, which is controlled at the frequency $f_{SL}$, a band-pass filter 23, whose midfrequency is equal to $f_S$, a second sample-and-hold circuit 24, which is controlled at the frequency $f_S$, and a controller 25 to the voltage-controlled oscillator 26. The output signal of the latter is applied, on the one hand, to an output A3 of the signal-processing circuit 100 and, on the other hand, to a mixer 43 in this signal-processing circuit 100. The signal-processing circuit further includes two oscillators 30 and 31, which generate signals with the frequencies $f_{MH}$ and $f_{ML}$, respectively. These signals are applied to outputs A1 and A2, respectively, of the signal-processing circuit. The signals generated by the oscillators are also applied to a mixer 40, whose output is fed to a bandpass filter 41 followed by a divider stage 42. The output signal of the divider 42 is the second input signal for the mixer 43, which is fed with the output signal from the VCO 26, as mentioned above. The output of the mixer 43 is fed to an integrator 44, from whose output signal the rotation rate is determined in a device 45 in a manner known per se. The rotation rate is indicated by an indicator 46. The outputs of the oscillators 30 and 31 are fed to the above-mentioned switch 33. It should be mentioned that the control signals for the individual devices—provided that they have the same frequency—are derived from a single generator and, hence, are in synchronism.

If no further steps are taken in this instrument, the above-mentioned variations result (for example, the output signals of the oscillators 30, 31 have different intensities; the output beam of the Bragg cell strikes the optical waveguide 9 at slightly different points depending on the respective drive frequency). In the arrangement of FIG. 1, a drive signal of frequency $f_B$ and no drive signal are alternately applied to the Bragg cell 2. Thus, the light beam issuing from the laser is directed to the single-mode filter or to an absorber (not shown), as mentioned previously. As a result, the light beam from which the two component beams are derived is a pulse beam. To obtain a continuous signal for evaluation purposes, the sample-and-hold hold circuit 22 is, therefore, controlled at the same frequency at which the switch 15 is controlled, namely the frequency $f_{SL}$. To determine the rotation rate, the controller controls the VCO 26 in such a way that the signal of frequency $f_S$, at which the switch 33 is controlled, disappears. One of the signals fed to the mixer 43 is equal to the average frequency of the two frequencies generated in 30 and 31, i.e., $f_M = (f_{MH} + f_{ML})/2$. The other input signal for the mixer 43 is the output signal of the VCO 26. By mixing the signal of frequency $f_M$ and the signal of frequency $f_{VCO}$, a difference frequency is obtained which is directly proportional to the rotation rate. With a coiled arrangement (radius R) of the optical waveguide, the rotation rate $\Omega$ is determined from the $$f_M - f_{VCO} = \frac{2r}{n \cdot \gamma_0} \Omega,$$

where $\lambda_0$ = vacuum wavelength of the light, and n = refractive index of the optical waveguide.

The following explains with the aid of further embodiments what steps have to be taken to eliminate the errors mentioned in the introductory part of the specification. All embodiments are based on the instrument shown in FIG. 1. Similar reference characters are used to designate corresponding parts.

Figure 2:
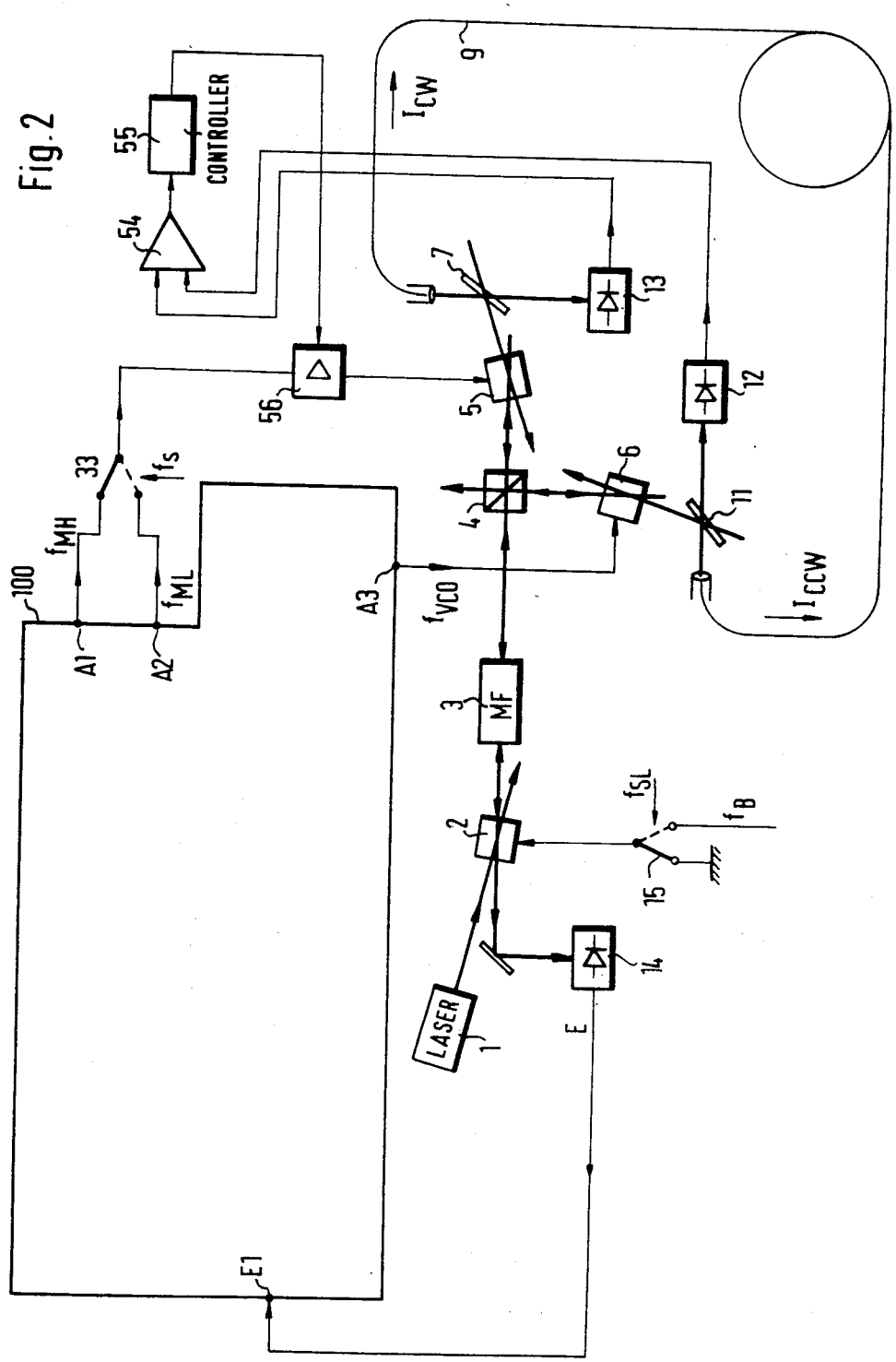
FIGS. 2 and 3 show embodiments in which the instrument of FIG. 1 has been supplemented with a regulating facility.

In the embodiment of FIG. 2, beam-splitting mirrors 7 and 11 are provided between each of the Bragg cells 5, 6 and the two ends of the fiber. These beam-splitting mirrors are so disposed in the beam path that a portion of each of the component beams emerging from the optical waveguide strikes an additional optical-to-electrical transducer 13, 12. The output signals of these optical-to-electrical transducers are fed to a differential amplifier 54, which is followed by a controller 55. The latter controls a variable-gain amplifier 56, which is inserted in the line between the switch 33 and the Bragg cell 5, in such a way that the drive signals for the Bragg cell 5, having the frequencies $f_{MH}$ and $f_{ML}$, have the same intensity. The beam-splitting mirrors are designed to transmit approximately 10% of the incident component beam to the associated optical-to-electrical transducer.

Figure 3:
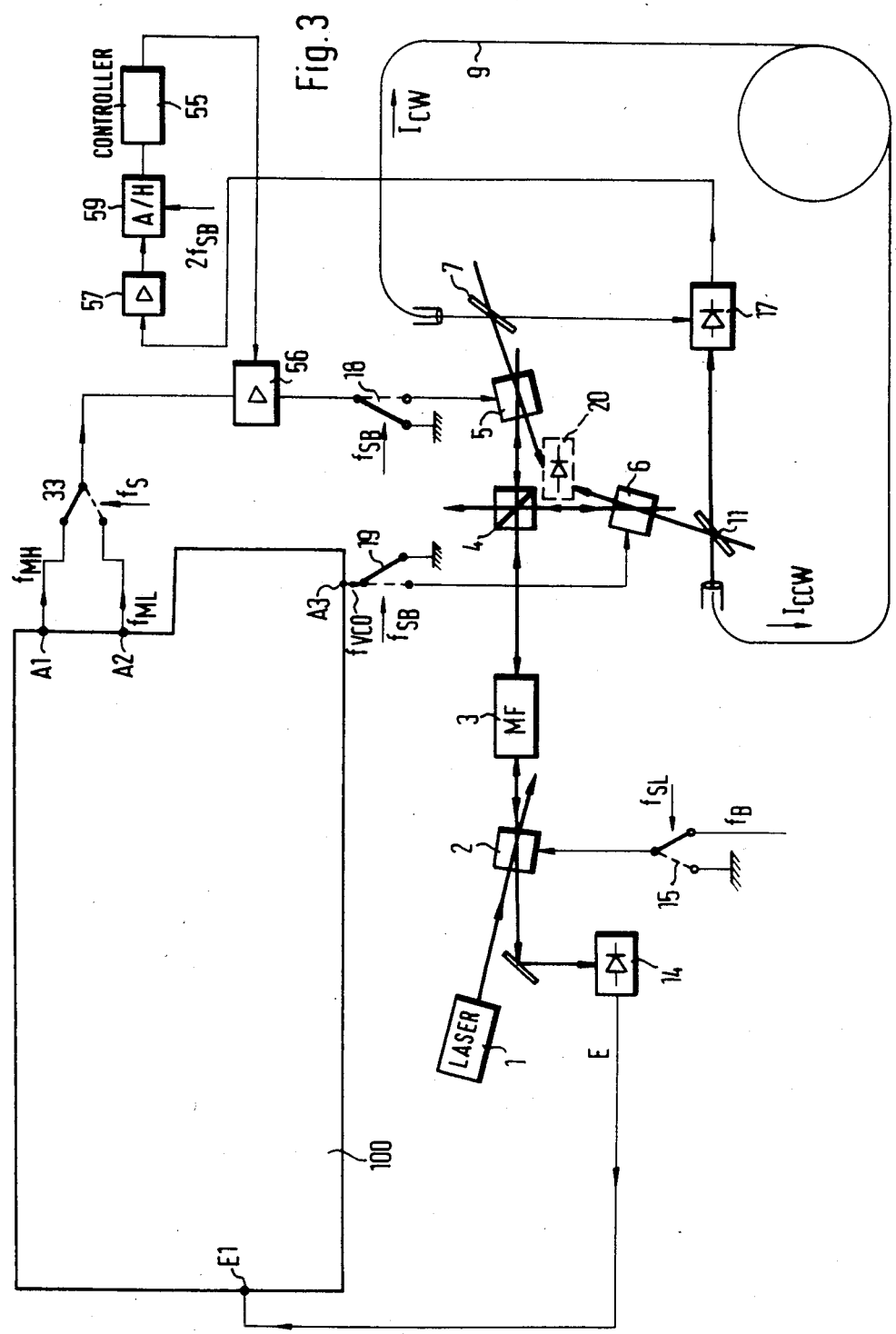

In the embodiment shown in FIG. 3, the signals with the frequencies $f_{MH}$ and $f_{ML}$ are applied to the Bragg cell 5 through a switch 18, and the signal with the frequency $f_{VCO}$ is applied to the Bragg cell 6 through a switch 19. These switches are controlled with a signal of frequency $f_{SB}$. Like in the embodiment of FIG. 2, beam-splitting mirrors 7 and 11 are provided between the Bragg cells 5, 6 and each end of the optical waveguide 9. Here, however, the component beams transmitted by the mirrors do not travel to one optical-to-electrical transducer each (like in FIG. 2) but to a single optical-to-electrical transducer 17. It is therefore necessary to separate the component beam $I_{CW}$ and $I_{CCW}$ in time. To accomplish this, the switches 18 and 19 are switched so that during given times, only the Bragg cell 5 is active (time $T_1$),
only the Bragg cell 6 is active (time $T_2$), and
both Bragg cells 5 and 6 are active.

In this connection, a Bragg cell is described as "active" if it is driven with such a signal that the component beam is coupled into that end of the optical waveguide associated with this cell.

Two switches 18, 19 are driven with signals of frequency $f_{SB}$, which differ in phase.

Furthermore, the waveforms of these signals must be chosen so that the above conditions can be satisfied. An example of the control signals is shown in FIG. 3a, where the following holds:

$T_1$: Bragg cell 6 is inactive. After the time $T_0 + \tau$ ($\tau$ = propagation time of the component beam in the optical waveguide 9), $I_{CW}$ is present at the input of the optical-to-electrical transducer 17.

$T_2$: Both Bragg cells are active. Both component beams travel around the optical waveguide and are then combined for evaluation purposes.

$T_3$: Bragg cell 5 is inactive. After the time $T_0 + T_1 + T_2 + \tau$, $I_{CCW}$ is present at the input of the optical-to-electrical transducer 17.

$T_4$: Like in $T_2$.

The output of the optical-to-electrical transducer 17 is fed to an amplifier 57, which is followed by a sample-and-hold circuit 59.

The output signal of the sample-and-hold circuit 59 has a constant value if the two component beams in the optical waveguide have the same intensity. If that is not the case (as shown in FIG. 3a), the output signal has a DC voltage component from which a controller 55 derives a control signal for a variable-gain amplifier 56 between the switch 33 and the Bragg cell 5.

If the Bragg cells 5, 6 are operated so that only a portion of the light beam is deflected, the undeflected portion can be sent directly to an optical-to-electrical transducer (indicated by a broken line in FIG. 3; reference numeral 20). In this case, the two beam-splitting mirrors 7 and 11 are not necessary.

In the embodiments of FIGS. 2 and 3, it was assumed that the signals delivered by the oscillators through the outputs A1 and A2 have the same intensity. On this condition, the control described insures that component beams of the same intensity are coupled into both ends of the optical waveguide, i.e., there is no intensity difference in the optical waveguide.

Figure 4:
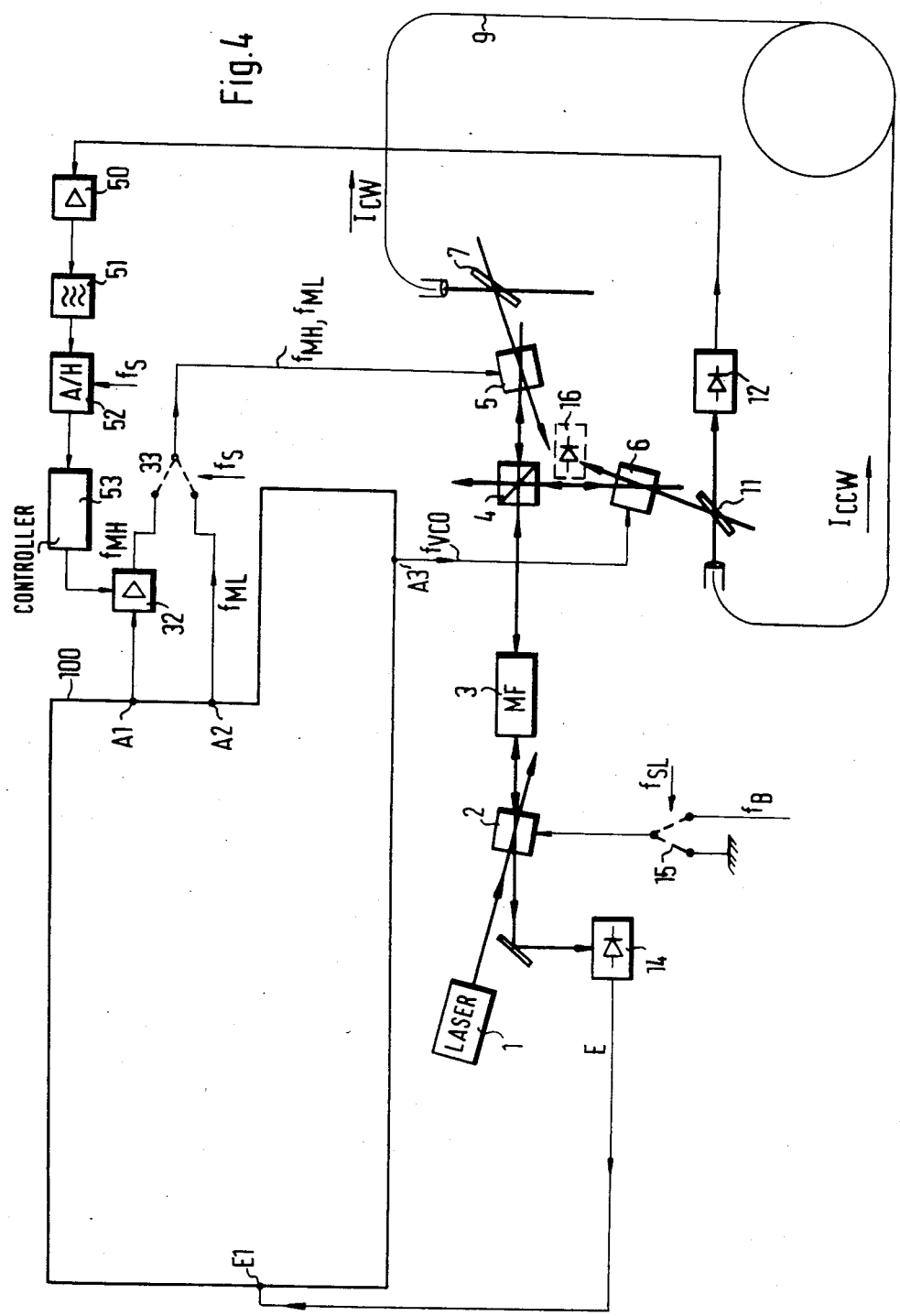

The following explains with the aid of the embodiment of FIG. 4 how the regulation must be performed if the output signals of the oscillators 30 and 31, having the frequencies $f_{MH}$ and $f_{ML}$, have different intensities. After travelling around the optical waveguide 9, the component beam $I_{CW}$, shifted in frequency by $f_{MH}$ or $f_{ML}$, is directed to the Bragg cell 6 via a beam-splitting mirror 11. The latter couples out a certain portion of the component beam which is directed to an optical-to-electrical transducer 12. For symmetry reasons, another beam-splitting mirror 7 is disposed between the Bragg cell 5 and the other end of the optical waveguide. Alternatively, the Bragg cell may be driven so that not the entire component beam is deviated, but that a certain portion of this component beam passes through the Bragg cell unchanged in direction, and this undeviated component beam enters an optical-to-electrical transducer 16. This is indicated by a broken line in FIG. 4. In this case, the two beam splitting mirrors 11 and 7 are not necessary. No matter how a portion of the component beam $I_{CW}$ was coupled out, the corresponding electric signal is fed to an amplifier 50 followed by a band-pass filter 51 whose midfrequency is equal to $f_S$. The output of this band-pass filter is fed to a sample-and-hold circuit 52, which is controlled by a signal of frequency $f_S$. From the output signal of this sample-and-hold circuit, a controller 53 derives a control signal. This control signal controls a variable-gain amplifier 32 between the output A1 and the switch 33 in such a way that the output signal of the optical-to-electrical transducer 12 contains no spectral component at the frequency $f_S$.

Now the fact that the signals of frequency $f_{MH}$ and $f_{ML}$ at the outputs of the oscillators may have differenct amplitudes is no longer disturbing.

So far, it has been assumed that the Bragg cell 2 is driven with two different drive signals of frequency $f_B$ and zero frequency, respectively. In this manner, on the one hand, the entire light beam produced by the laser is deflected in the direction of the single-mode filter, and, on the other hand, the entire beam coming back from the optical waveguide is directed to the optical-to-electrical transducer 14 via a deviating mirror. In the embodiment of FIGS. 2 and 4, however, it is also possible to drive the Bragg cell 2 continuously with one constant signal whose intensity must be chosen so that half of the beam issuing from the laser is directed to the absorber (not shown), while the other half is directed to the single-mode filter 3. In the opposite direction, half of the light beam coming back from the optical waveguide is directed via the deviating mirror to the optical-to-electrical transducer 14, while the other half returns to the laser 1. The manner in which the Bragg cell 2 is driven has no influence on the regulating facilities described. By contrast, in the embodiment of FIG. 3, evaluation of the signal resulting from the superposition of the two component beams emerging from the optical waveguide is possible only during a given time. During the other times, only one or the other of the two component beams is present. In this embodiment, therefore, the Bragg cell 2 is preferably driven so as to pass the light beam resulting from the superposition of the two component beams to the transducer 14 only during the times that this light beam is present, so that a corresponding electric signal is applied to the signal-processing circuit 100 only during these times.

In the embodiment which will now be described with the aid of FIG. 5, the component beams travelling around the optical waveguide 9 are assumed to be pulsed component beams. Pulsed component beams are again obtained by driving the Bragg cell 2 in a suitable manner. As described in connection with other embodiments and FIG. 1, a switch 15 switches between the two drive signals, one of which has the frequency $f_B$, at the frequency $f_{SL}$.

Before the regulation is explained in more detail, the additional devices required to provide the regulation will be described. The output signal of the optical-to-electrical transducer 14 is applied not only to the input E1 of the signal-processing circuit 100 but also to an amplifier 60 followed by a sample-and-hold circuit 61, which is controlled at the frequency $f_{SB}$. The output signal of the sample-and-hold circuit passes through a band-pass filter 62, whose midfrequency is $f_S$, to an additional sample-and-hold circuit 63, which is controlled at the frequency $f_S$. From the output signal of this sample-and-hold circuit 63, a controller 64 derives a control signal which controls a variable-gain amplifier 32 connected between the output A1 and the switch 33. An additional switch 19 between the output A3 and the Bragg cell 6 is controlled at the frequency $f_{SB}$. In this embodiment, no further optical-to-electrical transducers are required.

The operation of the arrangement is as follows. To be able to measure intensity differences between the signals of frequency $f_{MH}$ and $f_{ML}$, it must be possible to measure the intensity of the signal $I_{CW}$, i.e., of the uncombined signal. To accomplish this, instead of applying the signal from the output A3 to the Bragg cell 6 continuously, switching is effected between this signal and zero frequency. At zero frequency, the Bragg cell 6 no longer couples the light beam entering it into the optical waveguide. Thus, during the time that the switch 19 is in this position, only the component beam $I_{CW}$ is present in the optical waveguide. After the time $\tau$ (propagation time in the optical waveguide), the switch 19 must return to the position in which the signal of frequency $f_{VCO}$ is applied to the Bragg cell 6, so that a reciprocal construction is obtained again, i.e., that $I_{CW}$ can travel to the optical-to-electrical transducer. The control is performed so that light pulses entering the optical-to-electrical transducer are alternately the combined signal ($I_{CW}$ plus $I_{CCW}$) and only the component beam $I_{CW}$.

From the signal $I_{CW}$ plus $I_{CCW}$, the signal-processing circuit 100 determines the rotation rate in the known manner, while the controller 64 derives the control signal for the variable-gain amplifier 32.

Figure 5:
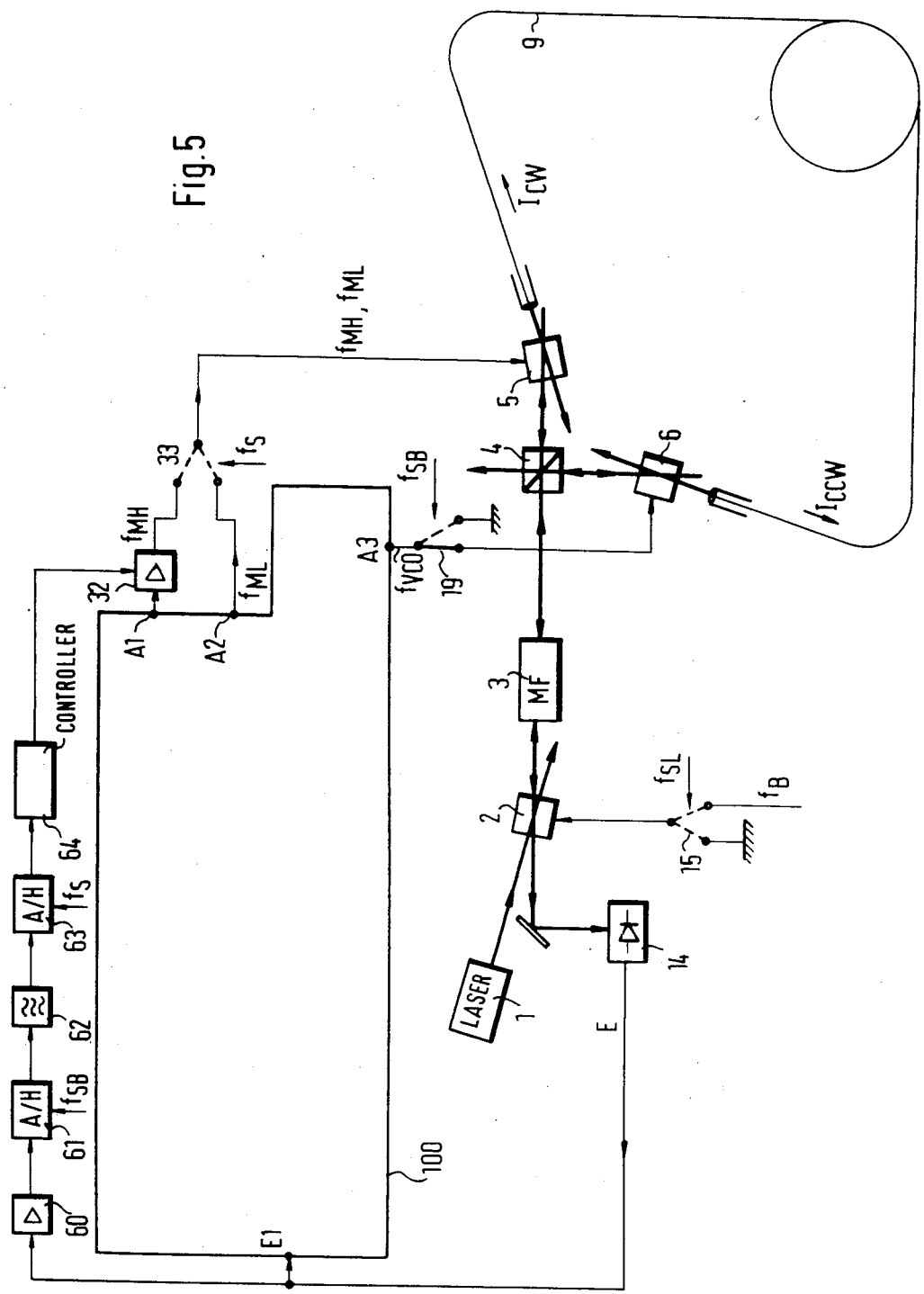

With the embodiments of FIGS. 4 and 5, it is thus possible to compensate for variations in the intensities of the signals delivered by the oscillator 30 and 31.

Figure 6:
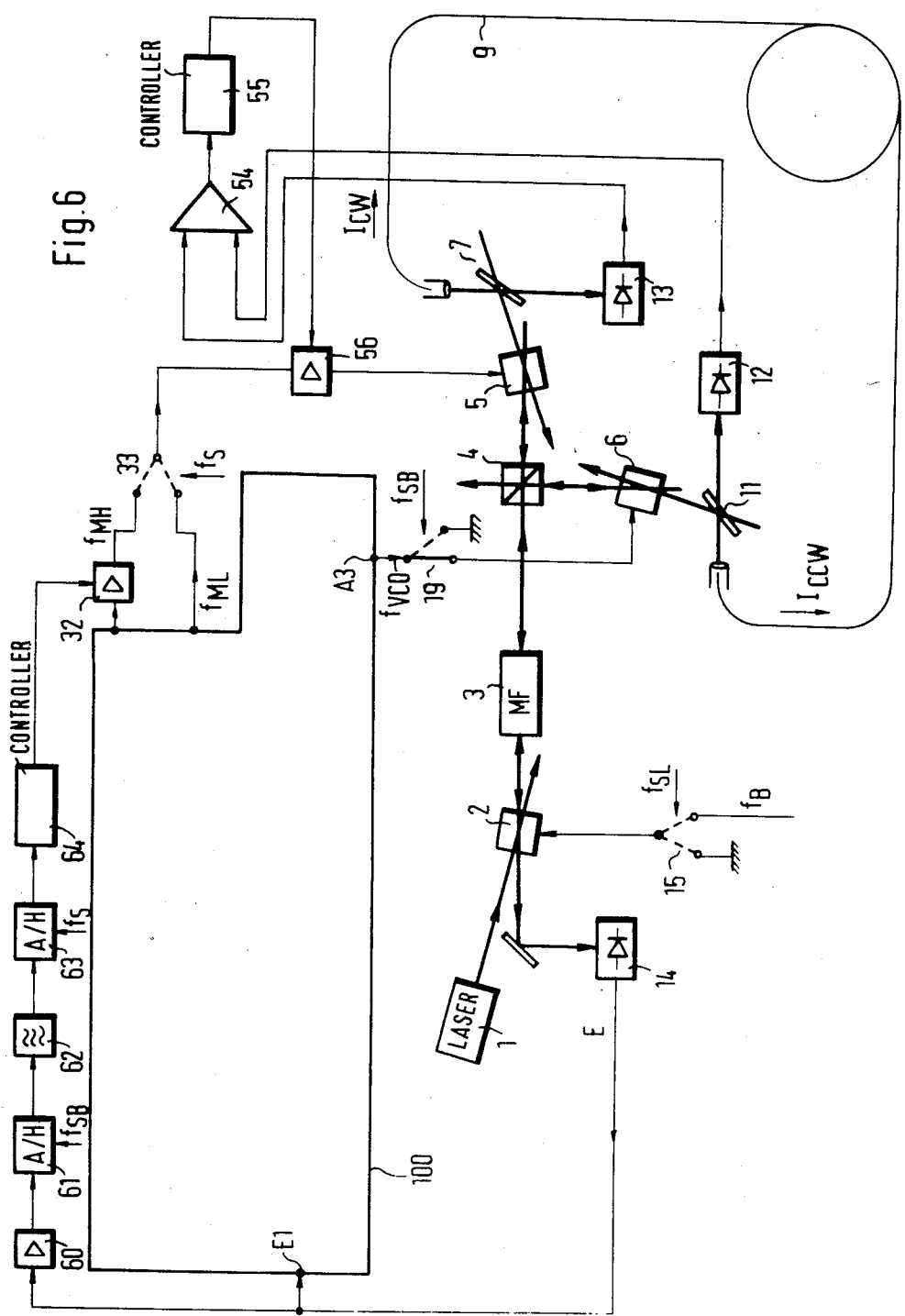

It is also possible to combine any of the embodiments in which the intensity differences between the oscillator-output signals are compensated for with any of the embodiments in which the intensity differences between the component beams circulating around the optical waveguide in opposite directions are compensated for. An instrumnet obtained by such a combination (embodiment of FIG. 2 and embodiment of FIG. 5) is shown in FIG. 6. With this instrument it is possible to compensate for both types of intensity variations.

The beam path was not dealt with in detail, for those skilled in the art will readily be able to implement it if it is known how a light beam is produced and which component it is to strike. In the embodiment of FIG. 3, for example, it must be insured by means of suitable imaging optics that both component beams $I_{CW}$ and $I_{CCW}$ impinge on the optical surface of the optical-to-electrical transducer 17.

In the desription, it was assumed that control signals having the same frequency are synchronous with one another unless otherwise stated.

The controllers were not dealt with in detail, because those skilled in the art will readily be able to implement them if it is known what control action has to be taken and which signal contains which information to be used for control purposes.

The description mentions that switching occurs between the output signals of the oscillators 30 and 31 at the frequency $f_S$. These two signals are fed to the modulator 5, implemented with a Bragg cell, periodically and one after the other. As a result, the component beam $I_{CW}$ is periodically shifted in frequency by amounts which depend on the magnitude of the drive signal. Particularly in connection with the claims, this is referred to as "modulation at the frequency $f_S$", because it is not necessary in the novel instrument to shift the frequency between two discrete values.

We claim:

1. Rotation rate measuring instrument comprising a light source (1) producing a light beam which is split by a first beam splitter (4) into two component beams ($I_{CW}$, $I_{CCW}$) which travel over a closed light path (9) in opposite directions, wherein the two component beams having travelled over the closed light path are combined (4) and directed to an optical-to-electrical transducer (14), wherein at least one of the component beams is modulated in a modulator (5) which is not located in the middle of the light path and is fed with a modulating signal of frequency $f_S$, and wherein the rotation rate is determined in a signal-processing circuit (100) from the phase difference between the two component beams due to the Sagnac effect, characterized in that at least one additional optical-to-electrical transducer (FIG. 3; 17) is provided to which a portion of each of the component beams is directed after the beams have traversed the optical waveguide (9), and that from the output signal of said additional optical-to-electrical transducer (17), a control signal is derived which varies the amplitude of the drive signal for the modulator (5) in such a way that both component beams emerging from the optical waveguide have the same intensity, or that the difference between the intensities of the two component beams emerging from the optical waveguide is held constant.

2. An instrument as claimed in claim 1, characterized in that a portion of each of the two component beams is coupled into an optical-to-electrical transducer (FIG. 2; 12, 13), that the outputs of said optical-to-electrical transducers (12, 13) are fed to a differential amplifier (54), that the differential amplifier is followed by a controller (55), that said controller produces the control signal by which a variable-gain amplifier (56) through which the modulating signal is fed to the phase or frequency modulator is controlled in such a way that the two component beams emerging from the optical waveguide have the same intensity.

3. An instrument as claimed in claim 1, characterized in that a control facility (FIG. 3; 18, 19) is provided which performs such a periodic control at the frequency $f_{SB}$ that during different time intervals within a period of the control signal, only one component beam ($I_{CW}$) or the other ($I_{CCW}$) or both component beams together ($I_{CW}$, $I_{CCW}$) travels/travel around the optical waveguide (9), that a portion of each of the component beams emerging from the optical waveguide is coupled out and directed to the additional optical-to-electrical transducer (17), that the output of the latter is fed to a sample-and-hold circuit (59) controlled by a signal locked to the control signal $f_{SB}$, and that a controller (55) produces a control signal by which a variable-gain amplifier (56) through which the modulating signal is fed to the modulator (5) is controlled in such a way that the two component beams ($I_{CW}$, $I_{CCW}$) have the same intensity or a constant intensity difference between them.

4. An instrument as claimed in claim 3, characterized in that the frequency ($2f_{SB}$) of the control signal for the sample-and-hold circuit is equal to twice the value of the frequency of the control signal for the control facility.

5. An instrument as claimed in claim 3, characterized in that each end of the optical waveguide (9) is preceded by a Bragg cell (5, 6) which is controlled by the signals from the control facility in such a way that the respective component beam is either coupled or not coupled into the optical waveguide.

6. An instrument as claimed in claim 4, characterized in that each end of the optical waveguide (9) is preceeded by a Bragg cell (5,6) which is controlled by the signals from the control facility in such a way that the respective component beam is either coupled or not coupled into the optical waveguide.

7. Rotation rate measuring instrument comprising a light source (1) producing a light beam which is split by a first beam splitter (4) into two component beams ($I_{CW}$, $I_{CCW}$) which travel over a closed light path (9) in opposite directions, wherein the two component beams having travelled over the closed light path are combined (4) and directed to an optical-to-electrical transducer (14), wherein at least one of the component beams is modulated in a modulator (5) which is not located in the middle of the light path and is fed with a modulating signal of frequency $f_S$, and wherein the rotation rate is determined in a signal-processing circuit (100) from the phase difference between the two component beams due to the Sagnac effect, characterized in that an additional optical-to-electrical transducer (FIG. 4, 12) is provided to which a portion of the modulated component beam ($I_{CW}$) emerging from the optical waveguide (9) is directed, that the output of said transducer (12) is fed to a controller (53) through a band-pass filter (51) having a midfrequency equal to the modulating frequency ($f_S$) and a sample-and-hold circuit (52) controlled at the modulating frequency ($f_S$), and that the controller controls a variable-gain amplifier (32) ahead of the modulator (5) in such a way that the intensity of the modulated component beam ($I_{CW}$) remains constant.

8. An instrument as claimed in claim 7, characterized in that, to generate the modulating signal, switching is effected between signals having different frequencies ($f_{MH}$, $f_{ML}$), and that the variable-gain amplifier (32) is located in the path of one of these two signals.

9. Rotation rate measuring instrument comprising a light source (1) producing a light beam which is split by a first beam splitter (4) into two component beams ($I_{CW}$, $I_{CCW}$) which travel over a closed light path (9) in opposite directions, wherein the two component beams having travelled over the closed light path are combined (4) and directed to an optical-to-electrical transducer (14), wherein at least one of the component beams is modulated in a modulator (5) which is not located in the middle of the light path and is fed with a modulating signal of frequency $f_S$, and wherein the rotation rate is determined in a signal-processing circuit (100) from the phase difference between the two component beams due to the Sagnac effect, characterized in that, to produce a pulsed light beam, the light source (FIG. 5; 1) is activated and deactivated (2, 15) at a given pulse repetition rate ($f_{SL}$), that the output of the optical-to-electrical transducer (14) is fed both to the signal-processing circuit (100) and, through a sample-and-hold circuit (61) controlled at the given pulse repetition rate, a band-pass filter (62) whose midfrequency ($f_S$) is equal to the modulating frequency, and an additional sample-and-hold circuit (63) controlled at the modulating frequency ($f_S$), to a controller (64), and that the controller controls a variable-gain amplifier (32) ahead of the modulator (5) in such a way that the intensity of the modulated component beam ($I_{CW}$) remains constant.

10. An instrument as claimed in claim 9, characterized in that, to generate the modulating signal, switching is effected between signals having two different frequencies ($f_{MH}$, $f_{ML}$), and that the variable-gain amplifier (32) is located in the path of one of these two signals.

* * * * *